United States Patent
Smith

(10) Patent No.: US 7,857,498 B2
(45) Date of Patent: Dec. 28, 2010

(54) QUICK CHANGE FLUORESCENT LAMP BALLAST SYSTEM

(76) Inventor: Toby Smith, 855 Sorrento, Gilroy, CA (US) 95020

( * ) Notice: Subject to any disclaimer, the term of this patent is extended or adjusted under 35 U.S.C. 154(b) by 1105 days.

(21) Appl. No.: 11/489,142

(22) Filed: Jul. 19, 2006

(65) Prior Publication Data
US 2008/0019113 A1    Jan. 24, 2008

(51) Int. Cl.
*H01R 33/00* (2006.01)

(52) U.S. Cl. .................. 362/640; 362/647; 362/652; 362/265; 362/435; 362/441; 315/56; 315/62; 315/209 R

(58) Field of Classification Search .......... 362/260, 362/265, 273, 289, 435, 441, 549, 640, 642, 362/647, 652, 655–657; 174/59, 559–563, 174/657, 660; 315/56, 62, 209 R, 149, 156
See application file for complete search history.

(56) References Cited

U.S. PATENT DOCUMENTS

| | | | |
|---|---|---|---|
| 2,702,378 A | 2/1955 | Talty | |
| 3,040,170 A | 6/1962 | Chwan | |
| 3,247,368 A | 4/1966 | McHugh | |
| 3,569,694 A | 3/1971 | Comer | |
| 4,674,015 A | 6/1987 | Smith | |
| 5,253,152 A | 10/1993 | Yang | |
| 5,350,316 A | 9/1994 | Van Wagener | |
| 5,720,546 A * | 2/1998 | Correll et al. | 362/221 |
| 5,942,727 A * | 8/1999 | Strange | 174/58 |
| 6,488,386 B1 | 12/2002 | Yan | |
| 6,700,327 B2 * | 3/2004 | Leleve et al. | 315/80 |
| 6,860,617 B2 * | 3/2005 | Fiene | 362/147 |
| 7,018,070 B2 * | 3/2006 | McCoy | 362/260 |

\* cited by examiner

*Primary Examiner*—Haissa Philogene
(74) *Attorney, Agent, or Firm*—GSS Law Group

(57) ABSTRACT

An electronic-ballast lamp system comprises a modular lamp ballast in a plug-in housing. A light fixture has matching sockets for the ballast and is pre-wired for the intended lamp tubes. In one instance, an electronic ballast accepts 100-300 VAC and 50-60 Hz power inputs, and provides the correct rapid-start, instant-on, or standard lamp outputs as sensed from the lamps themselves, or as read from a data card embedded in the light fixture. The data card is read optically or electronically, depending on application, or the lamp types may be dialed-in on the ballast itself.

8 Claims, 2 Drawing Sheets

QUICK CHANGE FLUORESCENT LAMP BALLAST SYSTEM

FIELD OF THE INVENTION

The present invention relates to fluorescent lamp systems, and in particular to plug-in ballasts that enable consumers to replace the ballasts without employing an electrician or special tools.

BACKGROUND

Fluorescent lamps, and all other gas discharge lamps, require a ballast to provide a high starting voltage to initiate the lamp and then use current limiting to safely sustain the discharge. Lamp manufacturers specify the lamp current, starting voltage, current crest factor, and other parameters for rated lamp life and output lumens. The American National Standards Institute (ANSI) publishes lamp input specifications for all ANSI type lamps. There are standard output (SO), high output (HO), and very high output (VHO) lamp tubes, each use different connectors. A typical 40 W 48" tube is supposed to run at 0.43 A., start at 400V-650V and have about a 93V working voltage. HO's operate at 1.0 A. VHO's operate at 1.5 A, e.g., 109 W.

Conventional ballasts use magnetic transformers operating at line frequency, and therefore are prone to buzzing and humming noises. Newer ballasts are electronic, do not use transformers, and can be absolutely mechanically silent. Magnetic ballasts are only crude AC current regulators, they make noise, do not tolerate temperature changes well, and often produce flickering. Newer electronic ballasts are now replacing the older types, and these can even correct the power factor, e.g., current is drawn over the entire AC cycle, not just the crests.

Many prior art patents in the United States discuss the desirability of making ballasts simple enough for ordinary consumers to change, but none has resulted in any widespread distribution of such lamp systems. The probable reason is each lamp type requires its own special ballast, and ballasts are very cost sensitive in the market. What is needed is a simple-to-install modular electronic ballast that can adapt itself to the job presented by reading power signatures from the lamps themselves or from data embedded for this purpose in the fixtures they plug into.

SUMMARY OF THE INVENTION

Briefly, an electronic-ballast lamp system embodiment of the present invention comprises a modular lamp ballast in a plug-in housing. A light fixture has matching sockets for the ballast and is pre-wired for the intended lamp tubes. In one instance, an electronic ballast accepts 100-300 VAC and 50-60 Hz power inputs, and provides the correct rapid-start, instant-on, or standard lamp outputs as sensed from the lamps themselves, or as read from a data card embedded in the light fixture. The data card is read optically or electronically, depending on application, or the lamp types may be dialed-in on the ballast itself.

An advantage of the present invention is a system is provided that allows consumers to change lamp ballasts as easily as they do the lamps themselves.

The above summary of the present invention is not intended to represent each disclosed embodiment, or every aspect, of the present invention. Other aspects and example embodiments are provided in the figures and the detailed description that follow.

BRIEF DESCRIPTION OF THE DRAWINGS

The invention may be more completely understood in consideration of the following detailed description of various embodiments of the invention in connection with the accompanying drawings, in which.

Figure 1:
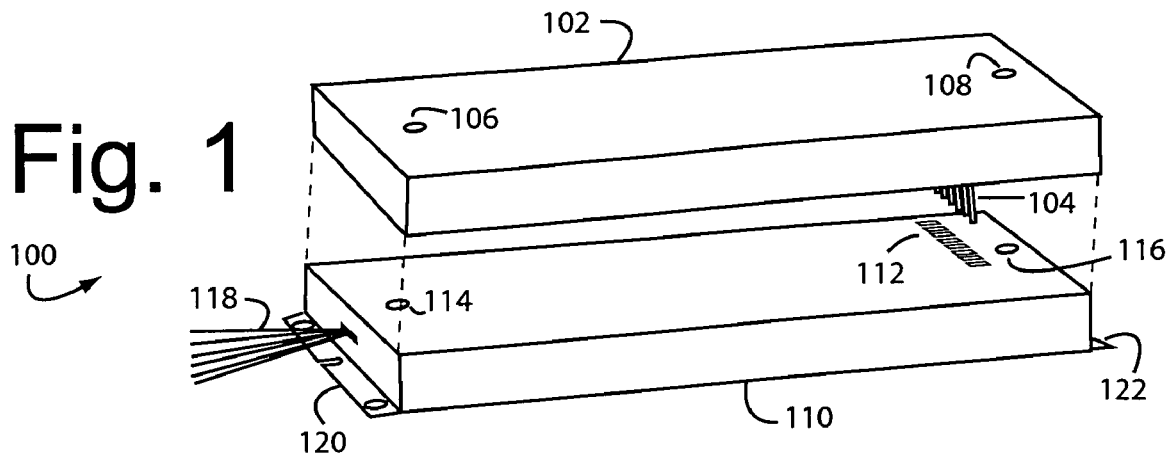
FIG. 1 is a perspective diagram of a first lamp ballast system embodiment of the present invention in which a modular plug-in ballast mounts on top of a lamp wire house and is secured with quick quarter-turn thumbscrews.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

FIG. 1 represents a first lamp-ballast system embodiment of the present invention, and is referred to herein by the general reference numeral 100. The system 100 comprises a lamp ballast 102 with a multi-pin electrical plug 104 and two quick quarter-turn thumbscrews 106 and 108. For example, the plug 104 is a stake-pin connector type. The thumbscrews 106 and 108 attach to a matching lamp wire house 110 with a multi-pin electrical socket 112, two quick quarter-turn nuts 114 and 116, wires 118 for power input and lamps, and opposite mounting flanges 120 and 122. The multi-pin electrical plug 104 and multi-pin electrical socket 112 connect to wires 118, and provide for AC-input power and 1-4 lamps through their matching sockets. Lamps with filament heaters have two-connectors at each end, and the higher starting and continuing operating voltages are applied across the ends after heating.

There are practically an infinite number of types of electrical connectors 104 and 112 and ways they could be wired. All of which could make the lamp ballast 102 incompatible with the lamp wire house 110 if produced by different sources and at different times. The advantages of the present invention can only be realized if such incompatibilities are avoided. Some sort of standardization is needed, and organizations such as ANSI and IEEE are in a position to develop and promulgate appropriate standards specifications.

The point is to make it easy for the average person with simple or no tools to change the ballast, it really should be no more difficult than changing a lamp tube. Users already know to read the model numbers off a tube in order to buy the right new ones, and ANSI standards have been successful in providing a universal numbering system that all manufacturers produce to. ANSI standards already classify ballasts.

Very different tubes cannot be physically plugged into the wrong sockets, but closer relatives can be incorrectly interchanged. If the tube lengths and socket pins are the same, the ballast in the fixture may actually operate the wrong lamp, but at reduced performance or safety.

Relatively straightforward electronic circuits can be used in ballast 102 to allow a wide range of AC-input powers, and a wide range of lamp types and powers. The kinds of lamps that can be accommodated by ballast 102 can be constrained by the socket types connected to wires 118 and the tube-length spacings between opposite sockets. Matching the correct ballast to the correct lamp application can rely on the user replacing the ballast 102 with the same part number as standardized by the Industry. Alternatively, the ballast 102 could provide for automatic adapting of itself, or having the means to be set to match the lamps connected to its outputs. Whatever clues from the user or measurements from sensors installed would be useful in allowing the ballast 102 to correctly match itself to the output lamp load environment presented. Such esoteric abilities drive up circuit complexity and manufacturing costs, but these can be balanced with a savings in how many different ballast types need to be stocked to satisfy consumer demand and the ease of installation afforded to the installers.

Figure 2:
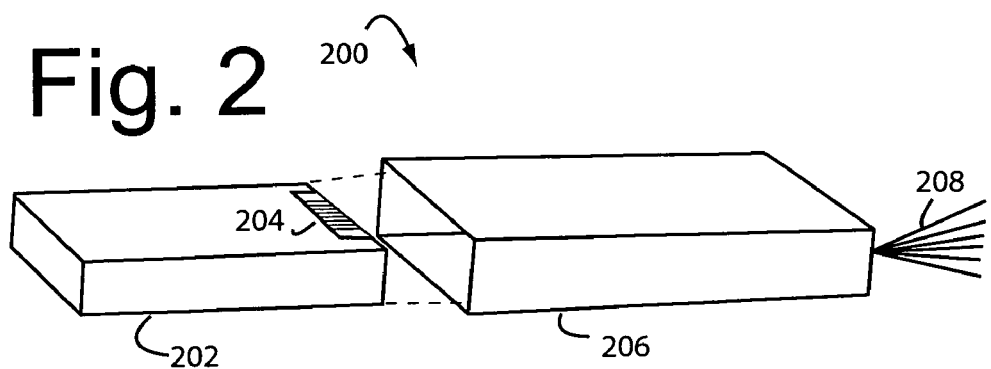
FIG. 2 is a perspective diagram of a second lamp ballast system embodiment of the present invention in which a modular plug-in ballast has edge connectors and slips on one end into a pocket receptacle that provides for lamp wiring.

FIG. 2 represents a second lamp-ballast system embodiment of the present invention, and is referred to herein by the general reference numeral 200. The system 200 comprises a lamp ballast 202 with an edge connector 204 on one end. A housing receptacle 206 provides wiring 208 that connects to edge connector 204 when the ballast 202 is slipped in place.

Figure 3:
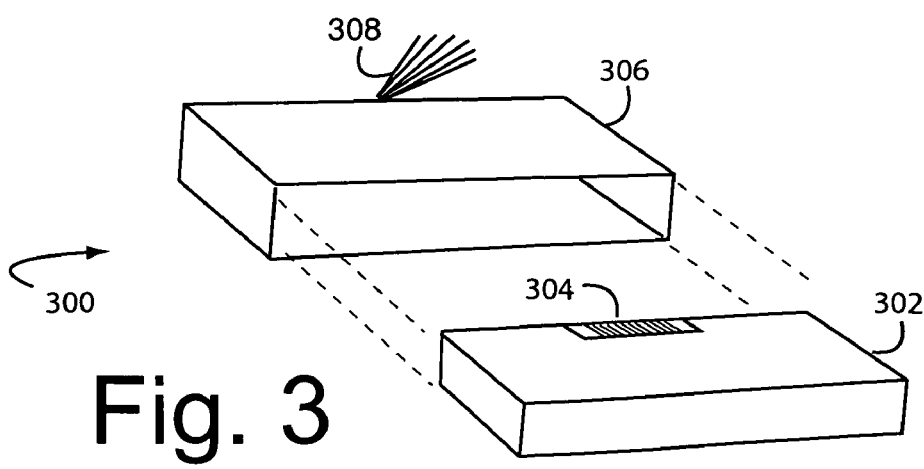
FIG. 3 is a perspective diagram of a third lamp ballast system embodiment of the present invention in which a modular plug-in ballast has edge connectors and slips broadside into a pocket receptacle that provides for lamp wiring.

FIG. 3 represents a third lamp-ballast system embodiment of the present invention, and is referred to herein by the general reference numeral 300. The system 300 comprises a lamp ballast 302 with an edge connector 304 on one side. A housing receptacle 306 provides wiring 308 that connects to edge connector 304 when the ballast 302 is slipped in broadside.

Figure 4:
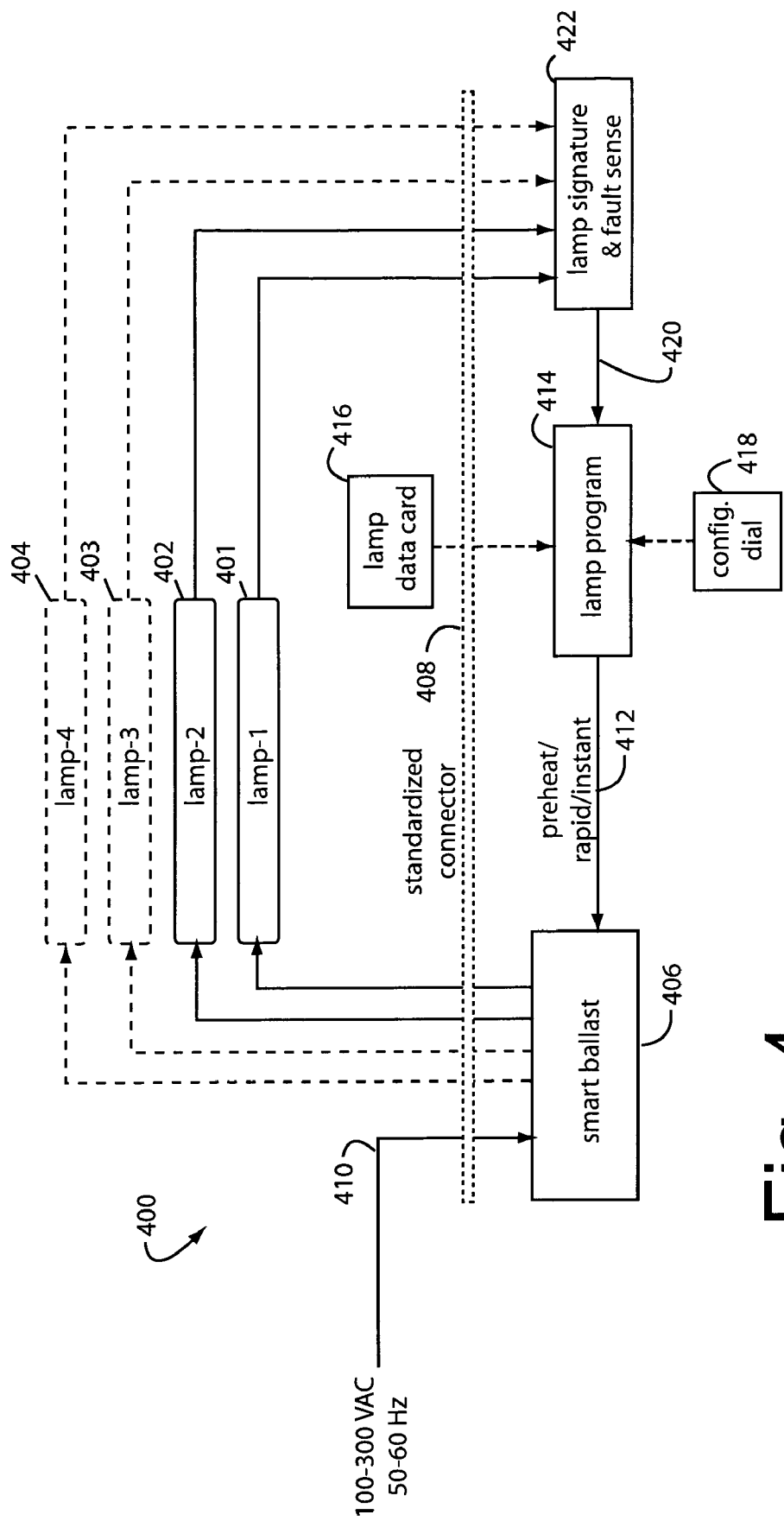
FIG. 4 is a schematic diagram of a ballast-lamp system embodiment of the present invention useful in the configurations shown in FIGS. 1-3.

FIG. 4 shows a smart lamp-ballast system embodiment of the present invention, and is referred to herein by the general reference numeral 400. The system 400 can drive one to four fluorescent lamps 401-404 with a smart ballast 406. An industry standardized connector 408 allows the ballast, such as in FIGS. 1-3, to be easily and readily replaced without special tools or re-wiring. Any of the world's utility power in the range of 100-300 VAC, 50-60 Hz, may be connected to a mains input 410. A selection 412 controls ballast operation in one of three modes: preheat, rapid start, and instant. A lamp program controller 414 determines preheat current, initiation voltages, and sustaining current levels according to ballast capabilities and the operational power needs of lamps 401-404.

A lamp data card 416 may be provided with a housing receptacle (e.g., 110, 206, 306) to automatically and precisely program or set the correct lamp operation program sent to smart ballast 406. Many different forms of communication can be used by lamp data card 416, such as barcode, jumpers, and read-only memories. In some embodiments, a dial 418 is used to select a lamp operation program suitable for lamps 401-404. For example, a dial could be included for a user to select amongst lamp model numbers. In other embodiments, an estimate 420 is provided from a lamp signature and fault sensor 422. Such sensor 422 can be wired in series with the power sockets for lamps 401-404 to analyze current waveforms and levels given various electrode preheating cycles and initiation voltages. A built-in characteristic table is then used to identify which types of lamps 401-404 is presently expected to drive. The estimate 420 is forwarded to the lamp program controller 414. Over-current faults and end-of-life indicia are used to depower the malfunctioning lamp until the tube is replaced.

Electronic ballasts operate at a high frequencies in the kilohertz range. At these higher frequencies, the light doesn't flicker, the tubes work more efficiently and they last longer. Many such ballasts can dim the lamps by lowering the regulated current delivered. Most electronic ballasts are intended for the 33 W 48" tubes in a T8 package (1") that put out almost as much light as a 40 W lamp.

Ballasts are designed to fit the needs of particular lamp types. Some modern electronic ballasts can provide power for more than one type of lamp, and they are able to optimize performance under a variety of conditions. But less than optimum environmental conditions can adversely affect lamp starting characteristics, light output, and operating life.

Fluorescent ballasts and lamps come in three basic types: preheat, rapid start, and instant start. The right ballast, wiring, and sockets must be correctly matched to the lamp type. One type lamp has two pins at each end for heating the filaments, and another type has a single stubby pin and no filaments for warming.

Preheat lamp electrodes are heated prior to initiating the discharge. A "starter switch" closes, permitting a heating current to flow through each electrode. The starter switch triggers the supply voltage to be applied across the arc tube to initiate the discharge. The electrode heating power is turned off after the lamp discharge is initiated. The circuits to do this can simply give enough time for starting, or actually sense that current is flowing.

Rapid start lamp electrodes are heated prior to and during operation. The ballast transformer has two special secondary windings to provide a low voltage to the electrodes.

Instant start lamp electrodes are not heated at all prior to operation. Ballasts for instant start lamps are designed to provide a starting voltage high enough to initiate a discharge with unheated electrodes.

Rapid start is the most popular mode of operation for four-foot 40 W lamps and high output eight-foot lamps. The advantages of rapid start operation include smooth starting, long life, and dimming capabilities. Lamps less than 30 W generally use the preheat mode, and are more efficient than the rapid start types because the electrodes do not need to be continually heated. However, these lamps tend to flicker during starting and have a shorter lamp life. Eight-foot slimline lamps use the instant start mode which is more efficient than rapid start, but the lamp life is shorter. The four-foot 32 W type F32T8 lamp is a rapid start lamp commonly operated in instant start mode with electronic high-frequency ballasts. In this mode of operation, lamp efficiency is improved, but at a cost in overall lamp life.

Fluorescent lamps themselves are reasonably efficient at converting input power to light, but the ballasts are very inefficient and waste a lot of power as heat. Lamp-ballast system efficiencies are measured in lumens per watt. The three ways to make fluorescent lamp-ballast systems more efficient include: reducing the ballast losses, operating the lamps at frequencies higher than line frequency, and avoiding power losses at the lamp electrodes. The losses in magnetic ballasts have been reduced by substituting copper conductors for aluminum, and by using higher grade magnetic components. Ballast losses may also be reduced by using a single ballast to drive three or four lamps, instead of the conventional practice of driving only one or two lamps per ballast. Careful circuit design increases efficiency of electronic ballasts. Electronic ballasts convert the 60 Hz line frequency to a higher frequency, and thus operate fluorescent lamps more efficiently. Rapid start magnetic ballasts improve efficiency by removing the lamp electrode power after starting.

The "ballast factor" is used to determine the light output for a particular lamp-ballast system, and is a measure of the actual lumen output for a specific lamp-ballast system relative to the rated lumen output measured with a reference ballast under ANSI test conditions. An ANSI ballast for standard 40 W type F40T12 lamps requires a ballast factor of 0.95. The same ballast has a ballast factor of 0.87 for 34 W energy saving type F40T12 lamps. ANSI ballasts are available with either high or low ballast factors (70-75%). The ballast factor is not simply a characteristic of the ballast, but of the lamp-ballast system. Ballasts can sometimes be used to operate more than one type of lamp. The 40 W type F40 ballast can used for 40 W type F40T12, 34 W type F40T12, and 40 W type F40T10 lamps. The ballast factor will vary for each combination, e.g., 95%, less than 95%, and more than 95%, respectively.

The ballast factor is not a measure of energy efficiency. Although a lower ballast factor means reduced lamp lumen output, it also means proportionally less input power will be consumed. As such, careful selection of a lamp-ballast system with a specific ballast factor allows designers to better minimize energy use by "tuning" the lighting levels in the space. For example, in new construction, high ballast factors are generally best, since fewer luminaires will be required to meet the light level requirements. In retrofit applications or in areas with less critical visual tasks, such as aisles and hallways, lower ballast factor ballasts may be more appropriate.

To avoid a drastic reduction in lamp life, low ballast factor ballasts (<70%) operate lamps in rapid start mode. This is particularly relevant for 32 W F32T8 lamps operated at high frequency.

Finding the ballast factor for lamp-ballast combinations may not be easy, as few ballast manufacturers provide this information in their catalogs. However, if the input power for a particular lamp-ballast system is known, an estimate of the ballast factor is possible.

Electromagnetic ballasts are designed to translate the 60 Hz input voltage into the electrical requirements of the lamps. A magnetic ballast alters the voltage, but not the frequency. Thus, the lamp voltage crosses zero 120 times each second, resulting in 120 Hz light output oscillations. This results in about 30% flicker for standard halophosphor lamps, operated at 60 Hz. The flicker is generally not noticeable but there is evidence that flicker of this magnitude can cause adverse effects, such as eyestrain and headache.

Most electronic ballasts, on the other hand, use high-frequency operation, which reduces lamp flicker to an essentially imperceptible level. The flicker percentage of a particular ballast is usually specified by the manufacturer. For a given ballast, the percent flicker will be a function of lamp type and phosphor composition.

One characteristic of iron-cored electromagnetic ballasts operating at 60 Hz, is the generation of audible noise. Noise can be increased by high temperatures, and it is amplified by certain luminaire designs. The best ballasts use high quality materials and workmanship to reduce noise. Noise is rated A, B, C, or D in decreasing order of preference. An "A" rated ballast will hum softly; a "D" rated ballast will make a loud buzz. The number of ballasts, their sound rating, and the nature of ambient noise in the room determine whether or not a system will create an audible disturbance.

Virtually all energy-efficient magnetic ballasts for F40T12 and F32T8 lamps are "A" rated, with a few exceptions, such as low temperature ballasts. Still, the hum of magnetic ballasts may be perceptible in a particularly quiet environment such as a library. Well-designed electronic high-frequency ballasts, on the other hand, should emit no perceptible hum. All electronic ballasts are "A" rated for sound.

Unlike incandescent lamps, fluorescent lamps cannot be properly dimmed with a simple wallbox device such as those used for incandescent lamps. For a fluorescent lamp to be dimmed over a full range without a reduction in lamp life, its electrode heater voltages must be maintained while the lamp arc current is reduced. As such, lamps operated in rapid start mode are the only fluorescent lamps suitable for wide-range dimming applications. The power required to keep electrode voltage constant over all dimming conditions means that dimming ballasts will be less efficient when operating lamps at dimmed levels.

Dimming ballasts are available in both magnetic and electronic versions, but there are distinct advantages to using electronic dimming ballasts. To dim lamps, magnetic dimming ballasts require control gear containing expensive high power switching devices that condition the input power delivered to the ballasts. This is economically viable only when controlling large numbers of ballasts on the same branch circuit. In addition, luminaires must be controlled in large zones that are determined by the layout of the electrical distribution system. Since the distribution system is fixed early in the design process, control systems using magnetic dimming ballasts are inflexible and are unable to accommodate changes in usage patterns.

Dimming of electronically-ballasted lamps, on the other hand, is accomplished within the ballast itself. Electronic ballasts alter the output power to the lamps by a low-voltage signal into the output circuit. High power switching devices to condition the input power is not required. This allows control of one or more ballasts independent of the electrical distribution system. With dimming electronic ballast systems, a low voltage control network can be used to group ballasts together into arbitrarily-sized control zones. This control network may be added during a building renovation or even, in some circumstances, during a lighting retrofit. Low voltage wiring does not have to be run in conduit, which helps keep installation costs down. In addition, it is less costly to modify the size and extent of lighting zones by reconfiguring low voltage wiring when usage patterns change. Low voltage wiring is also compatible with photocells, occupant sensors, and energy management system (EMS) inputs.

Dimming range differs greatly among ballasts. With most electronic dimming ballasts, light levels can vary between full output and a minimum of about 10% of full output. However, electronic, full-range dimming ballasts are also available that operate lamps down to 1% of full lumen output. Magnetic dimming ballasts also offer many dimming options, including full-range dimming.

Users often make the mistake of choosing electronic ballasts with the lowest input watts rating for fluorescent lighting systems. This may result in increased energy savings, but it can also lower ballast factor (BF) and produce inadequate lighting. Users can improve lighting levels by specifying BF based on the light level required for the space being lit.

New-generation ballast designs can reduce the number of models that organizations must stock and help you avoid confusion over which ballast belongs in which fixture. When working with older ballast designs, specifiers and designers had to carefully match ballasts to the lamps for which they were designed. If they weren't careful, lamp performance and lamp life usually suffered. Previous designs would often compromise the requirements of at least one lamp type.

Some new-generation ballasts reduce the need to critically match lamps and ballasts. Some new models use microprocessors to apply the exact program for the lamps that are connected. They can sense both the lamp type and quantity and configure operating characteristics to provide the required lamp starting and operating parameters. Many new ballasts have universal voltage capability, allowing input voltages from 100V to 300V. Others have high fault tolerances, and will shut off lamp current when a loose lamp wire or end-of-life (EOL) is detected.

The global standard for ballast size dropped recently to a 30 mm×30 mm cross-section (1.18 in.). As a result, ballast designs for both compact fluorescent lamps (CFL's) and linear fluorescent lamps are becoming smaller and lighter. Fixture manufacturers are incorporating these designs into new products and new models of slim-profile indirect and direct-indirect fixtures.

The efficiency of electronic fluorescent ballasts has also improved recently. Many users have installed instant-start ballasts, even though such shorten lamp life. Some users claim the energy savings of 1.5 W per lamp more than pays for the reductions in lamp life. Program-start type ballasts for optimum starting conditions, can provide as many as 100,000 starts, and the lamps last 50% longer. Such applies cathode heat for a precise time prior to lamp ignition, and then removes it once the lamp has ignited. At least one manufacturer provides a program-start ballast for type T5-HO lamps.

The higher efficiency of these ballasts, coupled with the lower maintenance costs, make them an ideal alternative to rapid-start models for switching applications. Some electrical professionals predict program-start models will replace rapid-start models in a few years because their longer lamp life cuts down on replacement costs.

All fluorescent lamp ballasts manufactured for commercial and industrial use in new and renovation markets must meet new, stringent standards of efficiency agreed upon by the U.S. Department of Energy (DOE), ballast and lamp manufacturers, and other stakeholders such as environmental organizations and the American Council for an Energy Efficient Economy. These new standards will eliminate most of the less efficient magnetic ballasts by 2005.

Most of the new miniaturized, electronic compact fluorescent (CFL) ballasts are designed for higher wattage rapid-start (4-pin) CFL's with power ratings of 26 W, 32 W, or 42 W. One manufacturer recently introduced a ballast that operates one 42 W, one 32 W, one 26 W, or two 26 W CFL's. They operate the lamps above 42 KHz to avoid interfering with infrared remote controls, and they are available with high power factor and high BF (0.95). Most feature total harmonic distortion (THD) of less than 20% and carry 5-yr warranties.

These new ballasts are showing up as OEM packages for downlights and sconces, but end-users can also buy them for retrofit applications. They feature end-of-life protection circuitry, and the lamps automatically relight when replaced.

Advances in HID ballasts have also addressed the unique characteristics of pulse-start (PS) metal-halide lamps. PS lamps do not have a starter electrode, and they do not require the ballast to provide the peaking voltage necessary for older standard metal halide (MH) lamps. Therefore, these lighting system designs have lower current crest factors, which translates into better lumen maintenance and longer lamp life. Electronic ballasts are also available for most PS MH lamps.

The major benefit of this design is lamp current control, which creates a more stable lamp operation. Stable operation can reduce color variations in lighting systems that must tolerate wide fluctuations in line voltage.

While the present invention has been described with reference to several particular example embodiments, those skilled in the art will recognize that many changes may be made thereto without departing from the spirit and scope of the present invention, which is set forth in the following claims.

The invention claimed is:

1. A ballast-lamp system, comprising:
   a lamp ballast with a plug-in connector providing for all electrical connections to mains power input and any lamps; and
   a wired base having a matching socket for said plug-in connector and for providing intermediate wiring between the lamp ballast and said mains power input and any lamps.

2. The ballast-lamp system of claim 1, further comprising:
   a pair of quick-turn screws disposed in the lamp ballast and providing for a means to fasten the lamp ballast to the wired base.

3. The ballast-lamp system of claim 1, further comprising:
   a stake-pin connector is used for the plug-in connector; and
   a socket for the stake-pin connector comprises the matching socket in the wired base.

4. The ballast-lamp system of claim 1, further comprising:
   an edge connector is used for the plug-in connector; and
   a socket for the edge connector comprises the matching socket in the wired base.

5. A ballast-lamp system, comprising:
   a lamp ballast with a plug-in connector providing for all electrical connections to mains power input and any lamps;
   a wired base having a matching socket for said plug-in connector and for providing intermediate wiring between the lamp ballast and said mains power input and any lamps; and
   selection means for operating said lamps in rapid start, instant, or preheat modes according to lamp type information provided after the ballast is attached to the wired base.

6. The ballast-lamp system of claim 5, further comprising:
   a lamp signature sensor for detecting which lamp types are connected to the ballast output by analysis of voltage and current characteristics over time, and connected to cause the selection means to set its mode of operation to one of said rapid start, instant, or preheat modes.

7. The ballast-lamp system of claim 5, further comprising:
   a lamp program card disposed in the wired base and providing for optically or electronically read data that directs the selection means to set its mode of operation to one of said rapid start, instant, or preheat modes.

8. The ballast-lamp system of claim 5, further comprising:
   a dial disposed attached to the ballast and providing for data that directs the selection means to set its mode of operation to one of said rapid start, instant, or preheat modes.

* * * * *